May 23, 1939. T. I. SHERRILL 2,159,715
CABLE CASING CUTTER
Filed March 8, 1937
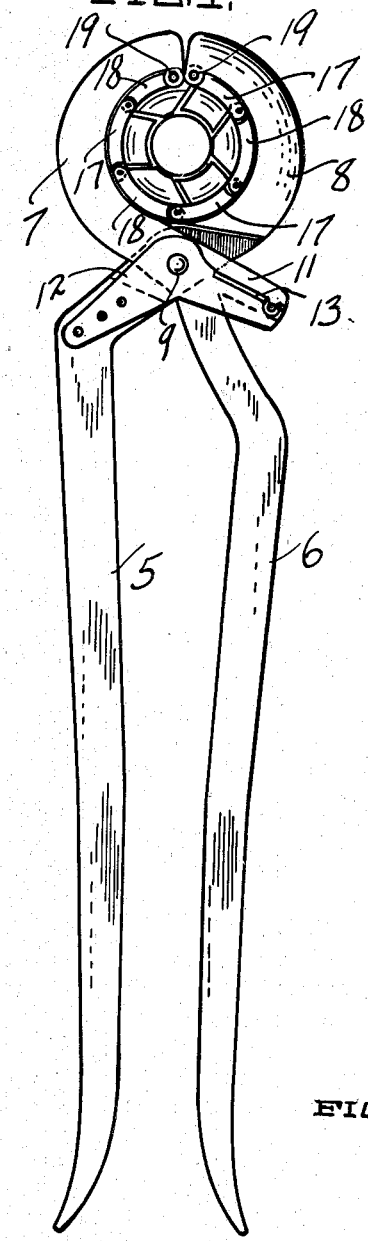
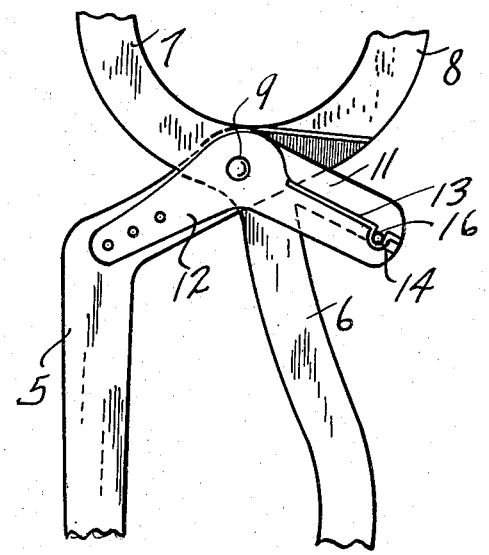
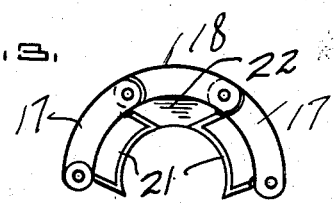
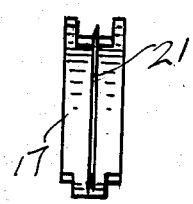
INVENTOR:
T. I. SHERRILL.
BY Victor J Evans Co
ATTORNEYS.

Patented May 23, 1939

2,159,715

UNITED STATES PATENT OFFICE 2,159,715

CABLE CASING CUTTER

Ted I. Sherrill, Darby, Mont.

Application March 8, 1937, Serial No. 129,717

2 Claims. (Cl. 30—100)

This invention relates to improvements in cutting devices and has particular reference to a device for cutting armored cable as well as the individual wires thereof, and further, stripping the insulation from the wires.

The principal object of the invention is to produce a device of this character which is simple in construction, easy to operate, and readily transportable.

A further object is to produce a device of this character wherein the cutting elements may be readily removed for sharpening purposes.

A still further object is to produce a device wherein the cutting elements will exert an even pressure about the entire surface of the cable and will cut only through the armor thereof.

Other objects and advantages will be apparent during the course of the following description.

In the accompanying drawing forming a part of this specification and in which like numerals are employed to designate like parts throughout the same:

Fig. 1 is a side elevation of my tool;

Fig. 2 is an enlarged fragmentary detailed view showing the wire cutting and stripping feature;

Fig. 3 is a side elevation of several of the cutter elements joined together;

Fig. 4 is a side elevation of one of the cutter elements;

Fig. 5 is an end elevation of one of the cutter elements;

Fig. 6 is a cross section of one of the cutter elements; and

Fig. 7 is a similar cross section of another of the cutter elements.

Armored cable consists of a plurality of wires insulated one from another and surrounded by a metal covering. This covering may be of a spiral formation, or may be of any other type of covering. It is often necessary to cut this insulation of armor in order to reach the wires within the cable. A hack saw is sometimes used, but there is always a possibility of cutting the wires within the cable, which should be avoided.

Applicant has, therefore, devised a means for removing the cable armor by cutting around the circumference thereof and through the armor only a sufficient distance to sever the armor. Afterwards, the same may be removed from the cable and the wires exposed. If it is desired to cut the wires and remove the insulation therefrom, my tool will also accomplish this purpose.

In the accompanying drawings wherein for the purpose of illustration is shown a preferred embodiment of my invention, the numerals 5 and 6 designate two handles, each of which is provided with a semi-circular end 7 and 8 respectively. These handles are pivoted together as at 9. The handle 6 has an extension 11, and the handle 5 has a plate 12 riveted thereto. The pivot 9 also goes through the plate 12. Cutting edges 13 are formed upon the extension 11 and plate 12 and provide means for cutting individual wires. A recess 14 is provided in the plate 12, and a scraper 16 is provided on the extension 11, the scraper 16 entering the recess 14. When a wire with its insulation is placed in the recess 14 and the scraper 16 moved thereagainst, the insulation on the wire will be cut and will be stripped from the wire by pulling the wire in the proper direction. Secured to the semi-circular portions 7 and 8 are a plurality of linked segments 17 and 18. These segments are secured to the semi-circular portions 7 and 8 by screws or rivets 19. Each segment 17 carries a knife blade 21, and the segments 18 carry knife blades 22. The alternate knife blades 21 and 22 are bevelled in opposite directions and are so shaped that when the device is closed, as shown in Fig. 1, the cutting edges form a circular opening equal to the diameter of the inside of the armor of the cable.

When the device is used, spreading the handles 5 and 6 will cause the semi-circular portions 7 and 8 to spread, thus straightening out the chain links or segments 17 and 18 together with their blades 21 and 22. The device is now placed about a cable so that the central blade in the chain will contact the outer surface of the cable. As the handles 5 and 6 are moved toward each other, the chain and its blades will wrap around the cable, the edge of the blade biting into and cutting through the armor with an even pressure from all sides. The tool is designed in such a manner that for a given size of cable the blades will only pass through the armor thereof. The blades are beveled in opposite directions, which prevents any tendency of the tool to move sidewise, and further, prevents undue strain upon the links, as the twist of one blade tends to counteract the twist of the next adjacent blade.

It will thus be apparent that with my device, it will be possible to perform all the objects above set forth.

It is to be understood that the form of my invention herewith shown and described is to be taken as a preferred example of the same and that various changes relative to the material, size, shape and arrangement of parts may be resorted to without departing from the spirit of the invention or the scope of the subjoined claims.

Having thus described my invention, I claim:

1. In a device of the character described, a pair of handles pivoted one to the other, each handle carrying a semi-circular portion, a plurality of linked segments secured to said semi-circular portions and lying within said semi-circular portions, and each link having a cutting knife secured thereto, the cutting edges of said knives forming a complete arc of a circle when in operative position.

2. In a device of the character described, a pair of handles pivoted one to the other, each handle carrying a semi-circular portion, a plurality of linked segments secured to the free ends of said semi-circular portions and lying within the arc formed thereby, each link having a cutting knife secured thereto, the cutting edges of said knives forming the arc of a circle, and alternate knives thereof being beveled in opposite directions.

TED I. SHERRILL.